No. 838,372. PATENTED DEC. 11, 1906.
B. J. BLAMEUSER.
GALVANIC BATTERY.
APPLICATION FILED JUNE 7, 1905.
3 SHEETS—SHEET 1.
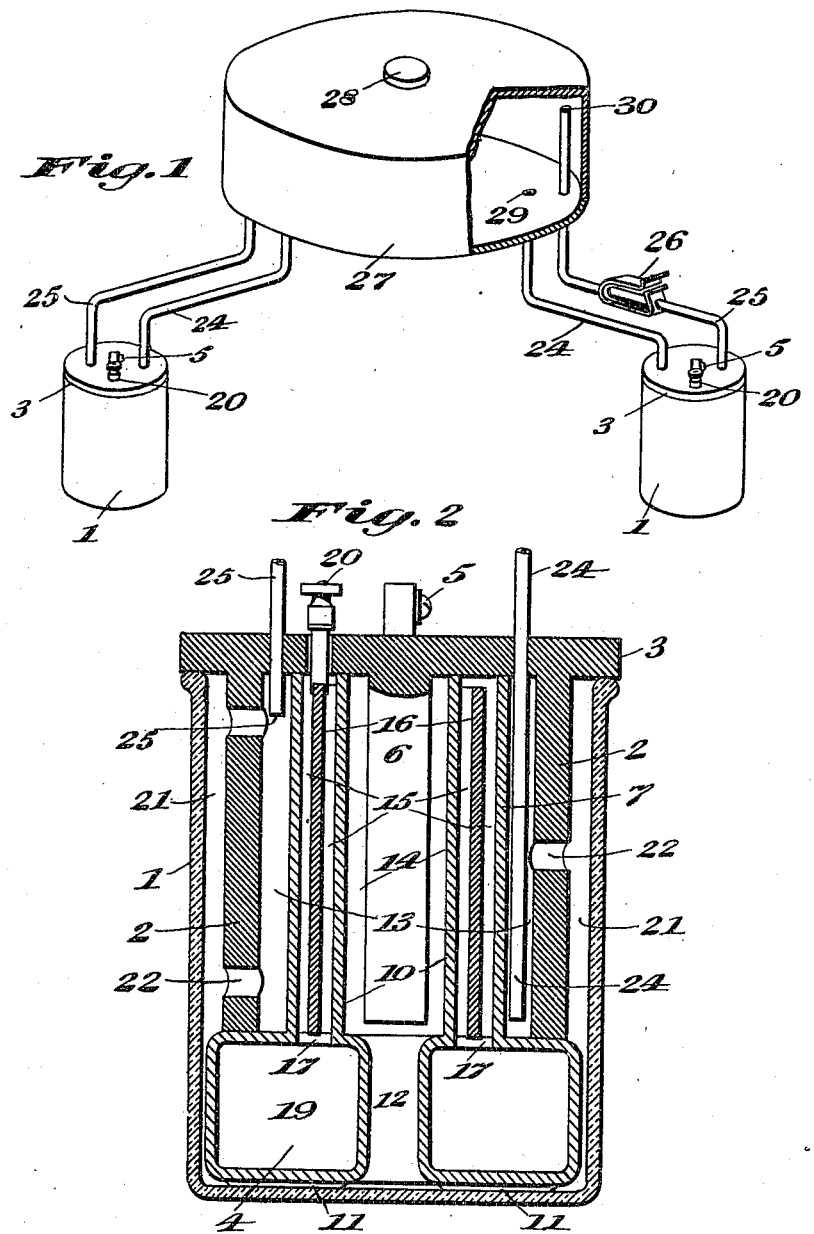
WITNESSES:
INVENTOR
Benjamin J. Blameuser.
BY
Attorney No. 838,372. PATENTED DEC. 11, 1906.
B. J. BLAMEUSER.
GALVANIC BATTERY.
APPLICATION FILED JUNE 7, 1905.
3 SHEETS—SHEET 2.
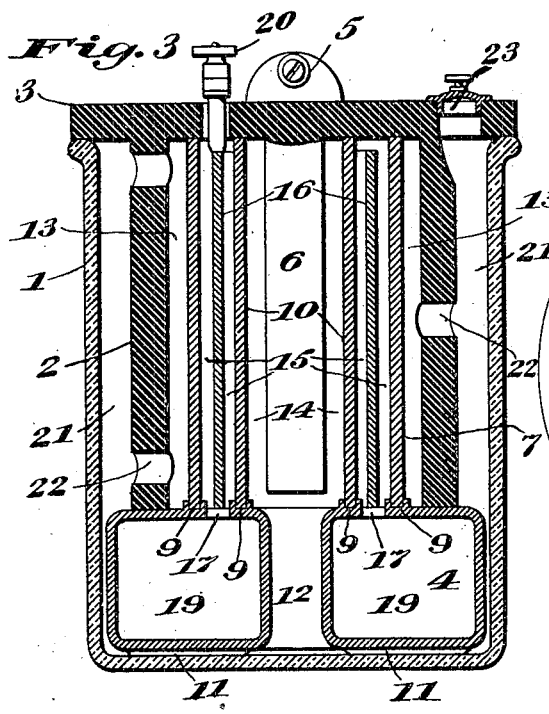
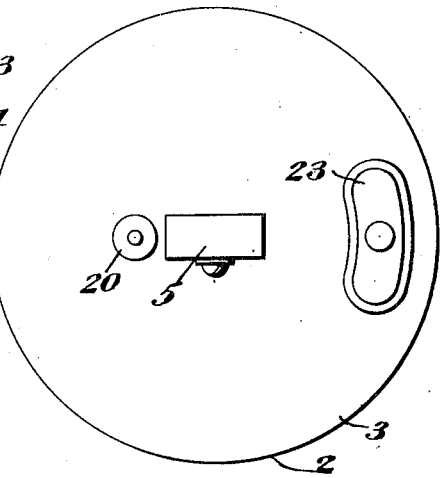
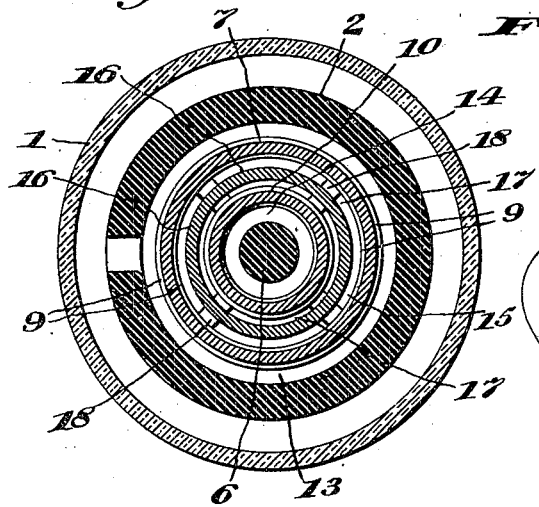
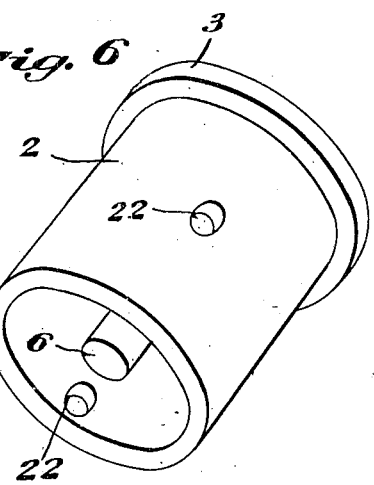
Witnesses
Inventor
Benjamin J. Blameuser.
By Chas. C. Tillman
Attorney No. 838,372. PATENTED DEC. 11, 1906.
B. J. BLAMEUSER.
GALVANIC BATTERY.
APPLICATION FILED JUNE 7, 1905.

3 SHEETS—SHEET 3.

Witnesses
Inventor
Benjamin J. Blameuser.
By Chas. C. Tillman
Attorney

UNITED STATES PATENT OFFICE.

BENJAMIN J. BLAMEUSER, OF CHICAGO, ILLINOIS, ASSIGNOR TO CHICAGO COMPOUND BATTERY CO., OF CHICAGO, ILLINOIS.

GALVANIC BATTERY.

No. 838,372.  Specification of Letters Patent.  Patented Dec. 11, 1906.

Application filed June 7, 1905. Serial No. 264,038.

*To all whom it may concern:*

Be it known that I, BENJAMIN J. BLAMEUSER, a citizen of the United States, residing at Chicago, in the county of Cook and State of Illinois, have invented certain new and useful Improvements in Galvanic Batteries, of which the following is a specification.

This invention relates to certain improvements in that class of galvanic batteries of which the device shown and claimed in my pending patent application, Serial No. 218,985, filed August 1, 1904, is a type; and the object of the invention is to provide for use in such batteries means for regenerating or renewing the solutions whereby the composition and efficiency of such solutions are maintained in a uniform manner and the constancy of the battery and of the current generated thereby are promoted, so that the battery is adapted for efficient use throughout a longer time than is possible where the strength of the solutions is permitted to fall during continued operation of the battery.

The invention consists in certain novel features of the construction and combinations and arrangements of the several parts of the improved galvanic battery whereby certain important advantages are attained and the device is rendered simpler, cheaper, and of greater constancy and is otherwise better adapted and made more convenient and effective for use, all as will be hereinafter fully set forth.

The novel features of the invention will be carefully defined in the claims.

Figure 7:
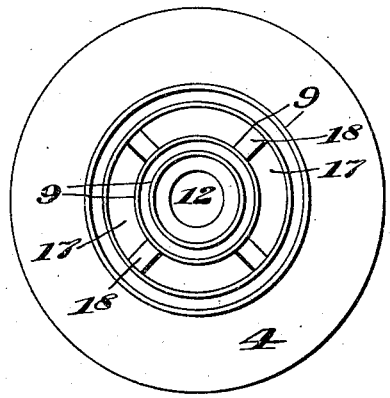
Figure 8:
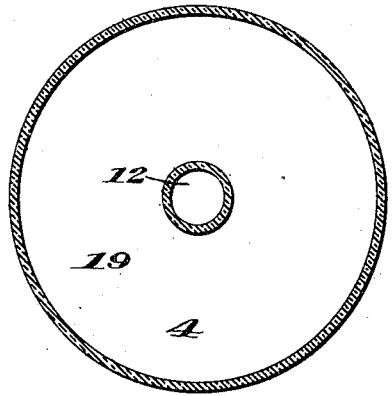
Figure 9:
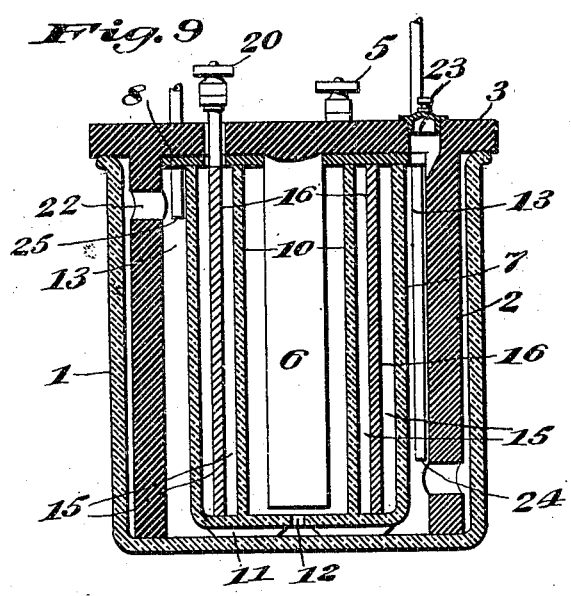
Figure 10:
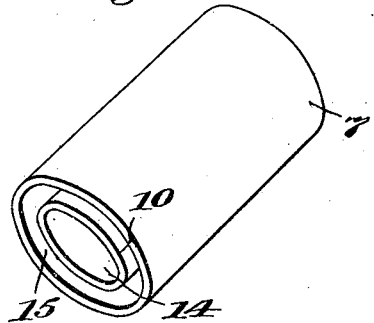

In the accompanying drawings, which serve to illustrate my improvements, Figure 1 is a perspective view, partly in section and showing two battery-cells provided with my improvements. Fig. 2 is a sectional view taken axially through one of the battery-cells and drawn upon an enlarged scale and showing an arrangement of means for maintaining a uniform or effective strength of both the electrolytic and depolarizing solutions of the cell. Fig. 3 is a sectional view similar to Fig. 2, but showing a modified arrangement of the cell according to my present invention. Fig. 4 is a plan view of the cell constructed as seen in Fig. 3. Fig. 5 is a sectional view taken horizontally through the upper part of the cell constructed as seen in Figs. 3 and 4, and Fig. 6 is a perspective view showing the carbon or positive-pole element to the cell detached and in its preferred form. Fig. 7 is a plan view showing the electrolyte holder or receptacle detached from the battery jar or container. Fig. 8 is a horizontal section taken through said electrolyte holder or receptacle and showing the internal chamber and central passage thereof. Fig. 9 is a sectional view similar to Figs. 2 and 3, but showing still another modified formation of cell embodying my improvements; and Fig. 10 is a perspective view showing a formation of double-walled porous cup or cell especially adaptable for use in connection with the form of cell shown in Fig. 9.

In my pending patent application above recited I have shown and claimed a galvanic battery wherein both positive and negative pole elements are formed with plural electrodes adapted for conjoint action to generate a current of sustained voltage with great constancy, and my present improvements are especially adapted for use in connection with batteries of that type by reason of the increased constancy and efficiency, due to maintenance of a uniform strength and constitution of the electrolytic and depolarizing solutions, whereby a still further and greater constancy and efficiency of the battery are afforded. However, although my present improvements are especially well adapted for use in connection with such batteries as that described and claimed in my before-mentioned patent application I do not desire to be understood as limiting myself in this respect, for it will be evident that the present invention is also well adapted for use in connection with other types of battery for promotion of constancy and efficiency.

Referring first to Figs. 1 and 2, 1 is a jar or container wherein the positive and negative pole elements are immersed in the electrolytic and depolarizing solutions. These elements are formed from carbon and zinc cylinders, by preference, and these are arranged one within the other in a well-known way. Between the elements are porous partitions or cups by means of which the intervening spaces are divided into chambers, in one of which is adapted to be received the active or electrolytic solution, which is preferably formed from sulfuric acid and to the action of which the zinc or positive-pole element is exposed, the other chambers being adapted to receive a supply of some suitable depolarizing agent—as, for example, a bichromate-of-potash solution—which is interposed in the path of the current and is adapted to take up the generated hydrogen to prevent polarization of the cell. The positive-pole or carbon element of the improved cell is formed with an outer hollow cylindrical shell 2 of a diameter to loosely fit in the jar or container 1 and open at its base, but having its upper part covered over by means of a flattened top plate 3, integral with the shell and having edge portions projecting and forming an annular flange around the top of the element and adapted to rest on the upper edge of the container 1 to produce a close joint between the parts. The container is of greater depth than shell 2, and in its lower part is arranged a holder or receptacle 4, having in it an annular chamber in which is received a supply of the active solution when the cell is charged. The lower edge of shell 2 rests on the top surface of the holder 4, and the carbon element of which said shell forms part has on its top plate a binding-post 5 for connection with a conductor of the circuit in which the cell is included. The carbon or positive-pole element has at the center of its top plate 3 a cylindrical rod or part 6 integral therewith and extended down axially within the hollow of shell 2, but of such a diameter as to afford between it and the inner face of the shell an annular chamber or space wherein is arranged the zinc or electronegative element 16, together with the porous walls or cups and the electrolytic and depolarizing solutions of the cell. 10 represents an inner porous wall or cup of cylindrical form arranged between the zinc element 16 and the carbon rod 6, with its lower edge supported at the top of the holder 4 and its upper edge engaged beneath the top plate 3 of the carbon element, and 7 represents the outer cylindrical porous cup or wall, which is arranged between the shell 2 and said zinc element 16, with its lower edge rested also on the holder 4 and its upper edge engaged under the top plate 3, similarly to the inner porous cup or wall 10. The diameters of these various parts are such that there is produced between the inner and outer porous cups or walls 10 and 7 an annular chamber 15 of a thickness adapted to receive the cylindrical zinc element 16 without contact thereof on either porous cup. There is also an annular chamber 13 outside the outer porous cup 7 and separating shell 2 therefrom, and within the inner porous cup 10 is another similar annular chamber 14, separating the carbon rod 6 from said inner porous cup.

The receptacle 4 may, if desired, be produced from porous material integral with the porous cups or walls 7 and 10, which are extended above it, and where this construction is employed, as indicated at Fig. 2, said holder or receptacle 4 may be saturated or coated over with paraffin or other similar material to fill its pores and render it impervious to the fluids of the cell. In other cases it may be desirable to produce the said holder or receptacle 4 from porcelain or other impervious acid-proof material, in which case the construction shown in Figs. 3, 5, and 7 may be preferable. In the construction illustrated in these figures the upper face of the holder or receptacle is provided with annular seats or sockets 9 9, in which the lower edges of the cylindrical porous cups 7 and 10 are rested or secured.

The holder or receptacle 4 is of less diameter than jar 1 and has a central opening 12, which may be of any diameter, and the under side of the holder or receptacle has projections 11 at intervals upon it, so that the bottom of the receptacle is spaced above that of jar 1 to establish communication around and beneath said receptacle and by way of the central opening 12 thereof between the inner chamber 14, separating carbon rod 6 from the inner porous cup 10, and the outer space or chamber 21, separating the shell 2 from the jar or container. The said outer space or chamber 21, between the shell 2 and jar 1, is adapted for communication with the space or chamber 13, separating said shell from the outer porous cup 7 by way of openings 22, produced in the said shell.

20 is a binding-post on the zinc element 16, being extended up from said element through an opening in the top plate 3 of the carbon element, and the upper edge of the zinc element is out of contact with said top plate.

17 17 represent openings produced in the top of the receptacle or holder 4 for affording communication between the chamber 15, in which the zinc element 16 is received, and the internal hollow 19 of said receptacle or holder, and for the support of the zinc element in said chamber 15 rests 18 (see Fig. 7) are extended across the bottom thereof between openings 17, said rests being integral parts of the top of the holder 4.

24 and 25 represent tubes or conduits, which may be formed from soft rubber or other material and which are passed down through the top plate 3 of the carbon element and have their lower ends arranged, respectively, at bottom and top of opposite sides of the chamber or space 13 between the shell 2 and outer porous cup 7 and in which the depolarizing solution is contained when the cell is charged. From the top plate 3 of the carbon element the tubes or conduits 24 and 25 lead upward and have communication near the bottom and top, respectively, of an additional or auxiliary container 27, which is supported in any preferred way above the cell or cells with which it is connected by said tubes or conduits 24 and 25. In Fig. 1 the upper end of tube 24, which communicates with the base of holder or container 27, is indicated at 29, while the upper end of tube 25, which has communication with the upper part of the auxiliary holder 27, is represented in Fig. 1 at 30.

In Fig. 1 I have shown a single auxiliary holder 27 connected with the tubes 24 and 25, leading to two cells, and in practice this arrangement may be employed and a single container or holder 27 be thus connected with a plurality of cells.

The holder 27 has air-tight walls and is adapted to receive a supply of the depolarizing solution for communication to the chambers of the cell in which such solution is held, and for filling said holder 27 I provide an inlet at the top thereof and which is adapted after the holder is filled to be tightly closed by a stopple 28 to prevent entry of air to replace such solution as may in the use of the device be supplied through the tubes 24 25 to chamber 13 of the cell. To regulate the flow of solution through the tubes 24 and 25, clips or cut-offs 26 of any desired kind may be employed, if desired.

In charging the cell, the holder 4, porous cups 7 and 10, and zinc element 16 being in position in the container 1, a supply of the active solution is poured down in the chamber 15 and through openings 17 into the hollow 19 of the receptacle or holder 4 until said hollow and chamber 15 are filled, as desired. The carbon element, with its connected tubes 24 and 25, is then placed in position with its shell outside the outer cup 7 and its rod 6 inside chamber 14, after which a supply of depolarizing solution is passed into the chamber 13 by way of tubes 24 and 25 from the auxiliary holder 27, in which the charge of such solution is kept. The supply of such depolarizing solution to chamber 13 may be effected by removal of the stopple 28 from holder 27, so that the solution within same is permitted to flow through tubes 24 and 25 until sufficient solution has been supplied to fill said chamber 13, together with chambers 21 and 14, connected therewith, up to the desired level, after which further supply of solution may be prevented by the use of the clips 26 until after the stopple 28 has been replaced and the fluid thus drawn from the holder 27 has also been replaced by other fluid poured into said holder.

In the use of the battery the depolarizing solution will be usually a saturated solution, and by gravitation the lower portions of the fluid in the holder 27 will be heavier and more dense, while the higher portions of such fluid will be lighter and less dense, and by absorption of hydrogen within the chambers 13 and 14 of the cell the depolarizing solution will become of less specific gravity, wherefore after continued use of the battery the lighter and weakened depolarizing solution from chamber 13 will be caused to pass upward by way of tube 25, which communicates with the upper part of said chamber, and will rise into the upper part of the auxiliary holder 27, being replaced in said chamber 13 by the heavier and denser fresh solution, which will be simultaneously supplied by way of the tube 24 from the lower part of the holder 27 to the lower part of said chamber 13. In this way during the operation of the battery a circulation of fresh and strong depolarizing fluid is maintained from the auxiliary holder 27 to the chamber 13 to replace the lighter spent fluid which is abstracted from said chamber 13 by way of the tube 25, so that a substantially constant and uniform strength and efficiency of the depolarizer is maintained not only in chamber 13, but also in the communicating chambers and passages of the cell. In the continued operation of the battery the waste products, usually mainly sulfate of zinc, in the chamber 15 and resulting from action of the electrolyte upon the zinc element being heavier than the initial electrolytic fluid will descend by gravity through openings 17 into the hollow of the receptacle or holder 4, displacing the electrolytic fluid therein, so that the same will be gradually discharged into the chamber 15 to maintain an effective strength of the electrolyte for action on the zinc element and further promoting constancy of the cell.

The improved galvanic battery constructed according to my invention is of a very simple and inexpensive nature and is especially well adapted for use by reason of the sustained voltage and greater constancy of the generated current and the resultant lessened liability of the variations in action which in batteries as ordinarily constructed are due to lessened strength and weakening of the solutions after continued use and which require periods of rest during which the solutions may regain strength for efficient operation, and it will also be obvious from the above description that the battery is capable of some modification without material departure from the principles and spirit of the invention, and for this reason I do not desire to be understood as limiting myself to the precise form and arrangement of the several parts of the device as herein set forth in carrying out my invention in practice. For example, in certain cases the structure shown in Fig. 3 may be employed. In this construction the auxiliary holder 27 and tubes 24 and 25 for the supply of depolarizing fluid to the chambers of the cell are omitted, the chamber 21 being designed to contain such a supply of said fluid as will serve to promote constancy for a considerable time. In this form of the battery there is an opening in the top plate 3 of the carbon element, as seen at 23, through which a supply of depolarizer may be poured into said chamber 21 for supply to the communicating chambers 13 and 14 of the cell. In other cases the structure shown in Fig. 9 may be desirable, and in this structure the holder or receptacle 4 may be dispensed with and the tubes 24 and 25 are connected with the top plate 3 of the carbon element for communication with the lower and upper parts of chamber 13 for supply of depolarizing fluid thereto from an auxiliary holder which may be similar to that above described with reference to Figs. 1 and 2. The form of battery shown in Fig. 9 is otherwise similar to that set forth in my before-mentioned patent application, the inner and outer porous cups 10 and 7 being integrally connected by a bottom closing the lower end of chamber 15 and having a central opening 12 and projections 11, similarly to the structure of the holder 4 above described, so that circulation of the fluid may take place between chambers 13 and 14. In this form of cell a non-conducting gasket 8 is also provided between the zinc element and the top plate 3; but this is immaterial to my invention.

Having thus described my invention, what I claim, and desire to secure by Letters Patent, is—

1. A galvanic battery comprising a container, a holder at the lower part of the container and having non-porous walls and an interior hollow to receive electrolytic fluid, inner and outer porous walls extended above the holder and spaced apart to provide a chamber, the top of the holder having openings affording communication between said chamber and the hollow of the holder, an electro positive battery element in the chamber between the porous walls and an electronegative element comprising a cylindical shell in the container surrounding the outer porous wall.

2. A galvanic battery comprising a container, a holder arranged within the lower part of the container and having a hollow to contain electrolytic fluid and provided with openings in its top for discharge of such fluid from its hollow, inner and outer porous walls extended above the holder at opposite sides of the openings in the top thereof and forming between them a chamber adapted to contain electrolytic fluid and communicating with the hollow of the holder through the openings in the top of said holder, an electropositive battery element in the chamber between the porous walls, and an electronegative battery element comprising a shell in the container surrounding the outer porous wall and rested at its lower edge on the top of said holder.

3. A galvanic battery comprising a container, two elements one of which has a shell and a rod axial in but spaced from the shell and the other of which is a cylinder inclosing the rod within the shell, inner and outer porous cups between which the cylindrical element is held and forming between them and said rod and shell chambers to receive electrolytic and depolarizing fluids, respectively, and a holder at the base of the container and on which the shell and porous cups rest and having an internal hollow to receive electrolytic fluid and openings in its top communicating with the chamber between said porous cups.

4. A galvanic battery comprising a container, two elements therein, one element having a shell of less diameter than the container, whereby an annular chamber is formed outside the shell and said shell having openings formed in it said element having a rod axial in but spaced from the shell, the other element being a cylinder inclosing the rod within said shell, inner and outer porous cups between which the cylindrical element is held and said cups being spaced from each other and from said shell and rod to produce chambers, the outer one of which has communication with the chamber outside the shell, by way of the openings in the shell, and a holder within but spaced from the lower part of the container and whereon the shell and porous cups rest, having an internal hollow and openings in its top communicating between the hollow and the chamber between the porous cups, said holder being also provided with a central opening communicating between the chamber inside the porous cups and the space between the holder and the base of the container for circulation of fluid between said inner chamber and the chamber outside the shell.

5. A galvanic battery having a chamber to receive depolarizing fluid and a holder adapted to contain a supply of such fluid and having at its upper and lower parts independent means for communication with said chamber for the supply of fluid thereto, whereby a continuous circulation of the fluid is afforded while the battery is in action.

6. A galvanic battery comprising a container wherein is a chamber to receive depolarizing fluid, a holder above the container and adapted to receive a supply of such fluid, a conduit extended from the upper part of said holder to the upper part of said chamber and a conduit extended from the lower part of said holder to the lower part of said chamber for the supply of depolarizing fluid thereto, whereby a continuous circulation of the fluid is afforded while the battery is active.

7. A galvanic battery comprising a container wherein is a chamber to receive depolarizing fluid, a holder above the container and adapted to receive a supply of such fluid and conduits extended, respectively, from the upper and lower parts of said holder to the respective upper and lower parts of said chamber for supply and discharge of fluid.

BENJAMIN J. BLAMEUSER.

Witnesses:
 CHAS. C. TILLMAN,
 M. A. WYMAN.